(No Model.)
F. A. MORRIS.
CLAMPING ATTACHMENT FOR KETTLE BAILS.
No. 582,076. Patented May 4, 1897.
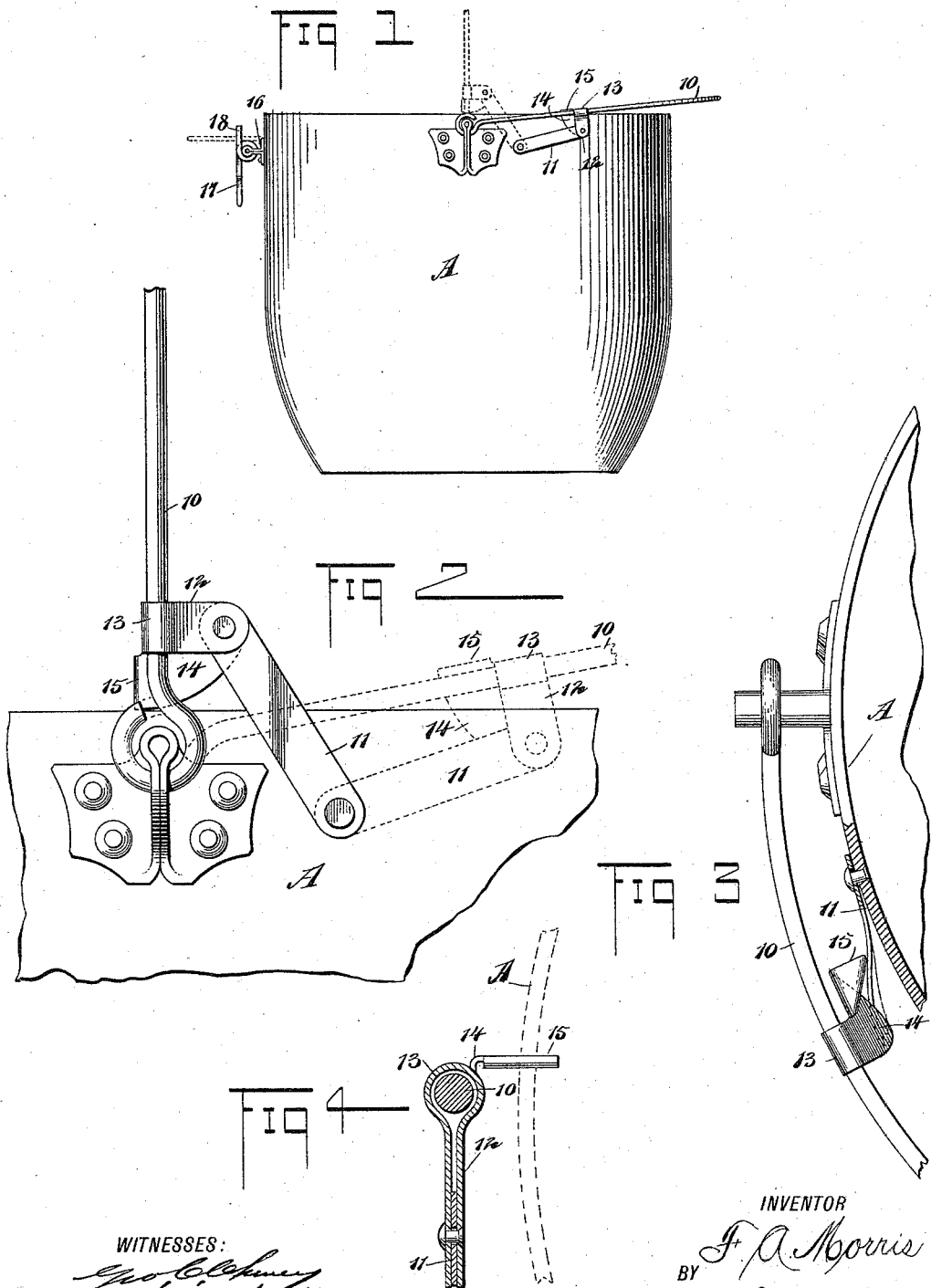
WITNESSES:
INVENTOR
F. A. Morris
BY
ATTORNEYS.

UNITED STATES PATENT OFFICE.

FRED A. MORRIS, OF GENESEO, NEW YORK.

CLAMPING ATTACHMENT FOR KETTLE-BAILS.

SPECIFICATION forming part of Letters Patent No. 582,076, dated May 4, 1897.

Application filed July 23, 1896. Serial No. 600,255. (No model.)

*To all whom it may concern:*

Be it known that I, FRED A. MORRIS, of Geneseo, in the county of Livingston and State of New York, have invented a new and Improved Clamping Attachment for Kettle-Bails, of which the following is a full, clear, and exact description.

The object of my invention is to provide an attachment for the bails of pots and kettles of various kinds, the attachment being simple, durable, and economic and so applied to the bail and to the pot that when the bail is carried downward to a position around the pot the attachment will be entirely out of the way and the top of the pot or kettle will be open to its full extent, so that a strainer or any auxiliary device may be applied to the pot or kettle as conveniently as though the attachment to the bail were not present.

A further object of the invention is to provide an attachment to a bail whereby when the bail is carried to an upright position over the pot or kettle it will be held in that position and cannot be moved rearward, so that by taking hold of the handle at the rear of the pot or kettle and grasping the bail in its upright position the water or other contents of the pot or kettle may be poured off or emptied out without danger of the vessel moving from the position it is desired to occupy, and whereby the opening for the exit of the liquid may be made as large as desired while the cover is on the vessel.

A further object of the invention is to provide an attachment for the bails of pots and kettles which may be utilized to lock the cover over the vessel or hold the cover partially open at that portion of the vessel where its contents are to be poured out, so that the liquid may be emptied from the vessel and the solids be retained therein, the operation being performed without the slightest danger of scalding, burning, or otherwise injuring the hands.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of a vessel to which the attachment is applied, the bail being shown in substantially a horizontal position. Fig. 2 is an enlarged view of a portion of the side of the vessel, showing the bail in an upright position and the attachment as preventing the bail from being carried rearward. Fig. 3 is a partial plan view of a portion of the vessel and a portion of the bail with the attachment applied, a portion of the vessel being in section; and Fig. 4 is a longitudinal section through the upper member of the attachment and through the bail.

In carrying out the invention the vessel A may be of any desired description, that shown in the drawings being a pot. The bail 10 may be of the ordinary construction and has hinged connection with the vessel in the ordinary or in any approved manner. The attachment is applied to each side of the vessel, and each attachment consists of a link 11, which is pivoted at its lower end to the outer face of the vessel at a point in front of the pivotal connection with the bail 10 of the vessel. At the upper end of the link 11, which is a single link, a double link 12 is pivoted. This double link 12 is at an angle to the single link 11, and the double link terminates at its rear end in an eye 13, through which the bail 10 is loosely passed. The inner member of the double link 12 is carried downward below the lower edge of its body portion, and is also carried in a rearwardly direction, ordinarily to a point slightly beyond the eye 13, and the rear end of the pendent member 14 is bent upon itself or is otherwise formed to produce a lip 15, which lip is usually inclined at its inner side edge, as shown in Fig. 3, and is at an angle to the pendent member 14, extending inwardly from the same to such an extent that when the bail is in an upright position, as shown in Fig. 2, the said lip will rest upon and bear firmly against the upper edge of the body of the kettle or pot, effectually preventing the bail from being carried rearward beyond the perpendicular, and when the bail is carried downward to a horizontal or a substantially horizontal position, as illustrated in Fig. 3, the double-link member 12 of the attachment will travel with the bail and will occupy such a position as to be entirely free and clear from the outer face of the vessel. Therefore the bail may be carried downward below the upper edge of the vessel unobstructedly, permitting any auxiliary vessel to be used in connection with the main vessel, as may be required.

At the rear central portion of the vessel A a bracket 16 or other form of offset is secured, and on this bracket or offset a handle 17 is pivoted in such manner that it may drop to a perpendicular position (shown in positive lines in Fig. 1) or may be carried to a horizontal position, as shown in dotted lines in the same figure, and the said handle is provided with lugs or extensions 18, which, when the handle is brought up to a horizontal position, will bear against or upon the upper face of the bracket 16, enabling a person by grasping the handle 17, carrying it to its upper position and bringing the bail 10 to a perpendicular position and the attachment in engagement with the body of the vessel, to have complete control over the pot or kettle, so that its contents may be emptied partially or entirely with the least possible trouble and with no danger to the operator.

It is evident that the lips of the attachments may be brought to bear upon the cover of the vessel when the bail is in an upright position, holding the cover firmly upon the vessel, and when, for example, it is desirable to drain water from potatoes or other vegetables the pot or vessel may be tilted, with the cover shifted rearward, so as to produce an opening at the front of any desired size, made secure by the proper adjustment of the attachments on the cover, and when the pot is manipulated to empty off the liquid the cover will be firmly held in the adjusted position, retaining the solids in the vessel.

An opening for draining off the liquid when the cover of the vessel is in place may be obtained by simply carrying the bail forward, thereby raising the lips 15 and permitting the pressure of the contents of the vessel to open the cover at the front any required distance, the cover being meanwhile held closed at the back, thus preventing the escape of steam.

Having thus described my invention, I claim as new and desire to secure by Letters Patent—

1. The combination, with a vessel and a bail therefor, of stops having a pivotal connection with the bail, and a lip adapted in one position of the bail to engage with the top of the vessel or its cover, as and for the purpose specified.

2. The combination, with a vessel and the bail of the same, of stops pivotally connected with the vessel at a point in advance of the pivotal connection of the bail therewith, the said stops consisting of pivotally-connected members one of which has sliding connection with the bail, the said sliding members of the stops having lips which extend inward, being of such dimensions as to engage with the upper edge of the vessel or its cover when the bail is brought to the upright position, as and for the purpose specified.

3. The combination with a vessel and a pivoted bail thereon, of a stop having a finger adapted to engage the edge of the vessel or its cover, and means controlled by the position of the bail for clamping or releasing said stop, substantially as described.

4. The combination with a vessel and a bail pivoted thereon, of a stop having sliding connection with the bail and a lip projecting inward therefrom, said stop being controlled by the position of the bail and adapted in one position of the bail to engage the vessel's top or cover, substantially as described.

5. A stop attachment for pots and other vessels and the bails of the same, the said attachment consisting of a link arranged for pivotal engagement with the vessel, a second link having a socket arranged to loosely receive the bail, and a lip projected inwardly from the aforesaid second link, adapted for engagement with the edge of the vessel or its cover, as and for the purpose set forth.

6. The combination, with a vessel and its bail, of a stop or clamp attachment, consisting of a link having pivotal connection with the vessel at one side of the pivot of the bail, a second link pivotally connected with the first-named link and having an eye through which the bail loosely passes, the link provided with an eye being also provided with a member extending downwardly and inwardly to a point at or near the eye, the said projecting member being provided with a lip arranged for engagement with the upper edge of the vessel or its cover when the bail is in a predetermined position, as and for the purpose set forth.

FRED A. MORRIS.

Witnesses:
J. B. ADAMS,
GEO. B. ADAMS.